(12) United States Patent
Allison et al.

(10) Patent No.: US 12,252,051 B2
(45) Date of Patent: Mar. 18, 2025

(54) FIBER BASED COMPOSITIONS FOR NOISE ABATEMENT AND COMPRESSION RESISTANCE

(71) Applicant: AURIA SOLUTIONS UK I LTD., London (GB)

(72) Inventors: Timothy Joel Allison, Marion, NC (US); James A. Frye, Marion, NC (US); Ernest Franklin Wilson, Albemarle, NC (US); Eric Staudt, Fletcher, NC (US)

(73) Assignee: Auria Solutions UK I, Ltd., London (GB)

( * ) Notice: Subject to any disclaimer, the term of this patent is extended or adjusted under 35 U.S.C. 154(b) by 834 days.

(21) Appl. No.: 17/345,060

(22) Filed: Jun. 11, 2021

(65) Prior Publication Data

US 2022/0009395 A1  Jan. 13, 2022

Related U.S. Application Data

(60) Provisional application No. 63/049,427, filed on Jul. 8, 2020.

(51) Int. Cl.
  *B60N 3/04* (2006.01)
  *B32B 5/26* (2006.01)
  (Continued)

(52) U.S. Cl.
  CPC ............. *B60N 3/042* (2013.01); *B32B 5/266* (2021.05); *B32B 5/271* (2021.05); *B32B 27/12* (2013.01); *C08L 23/12* (2013.01); *B32B 2262/0253* (2013.01); *B32B 2262/0261* (2013.01); *B32B 2262/0276* (2013.01);
  (Continued)

(58) Field of Classification Search
  CPC ......... B60N 3/042; B32B 5/266; B32B 5/271; B32B 27/12; B32B 2262/0253; B32B 2262/0261; B32B 2262/0276; B32B 2262/144; B32B 2305/20; B32B 2307/102; B32B 2605/003; C08L 23/12; C08L 2205/16; C08L 2207/20
  See application file for complete search history.

(56) References Cited

U.S. PATENT DOCUMENTS 3,726,964 A   4/1973  Krejci
5,205,018 A   4/1993  Leifeld et al.
(Continued)

FOREIGN PATENT DOCUMENTS

DE   10 2005 004 454 B3   10/2006
DE   10 2008 058 952 B4   8/2011
(Continued)

OTHER PUBLICATIONS

Espacenet translation of KR-20170039404-A (Year: 2024).*
(Continued)

*Primary Examiner* — Michael Zhang
(74) *Attorney, Agent, or Firm* — Grossman, Tucker, Perreault & Pfleger, PLLC; Steven J. Grossman (57) ABSTRACT

The present invention is directed at fiber compositions for noise abatement and compression resistance for vehicular applications. More particularly, the fiber compositions are suitable to replace expanded polypropylene foam pads utilized in vehicular carpet applications.

4 Claims, 9 Drawing Sheets

(51) Int. Cl.
*B32B 27/12* (2006.01)
*C08L 23/12* (2006.01)

(52) U.S. Cl.
CPC ..... *B32B 2262/144* (2021.05); *B32B 2305/20* (2013.01); *B32B 2307/102* (2013.01); *B32B 2605/003* (2013.01); *C08L 2205/16* (2013.01); *C08L 2207/20* (2013.01)

(56) References Cited

U.S. PATENT DOCUMENTS

| | | | |
|---|---|---|---|
| 5,529,479 | A | 6/1996 | Souders |
| 6,024,905 | A | 2/2000 | Doris |
| 6,033,607 | A | 3/2000 | Kataoka et al. |
| 6,241,168 | B1 * | 6/2001 | Young ............... B29B 17/04 |
| | | | 525/166 |
| 6,312,542 | B1 * | 11/2001 | Nagata ............... G10K 11/162 |
| | | | 156/181 |
| 6,588,462 | B1 | 7/2003 | Ogawa et al. |
| 7,198,739 | B2 | 4/2007 | La Forest et al. |
| 7,540,307 | B1 | 6/2009 | Khambete |
| 7,698,817 | B2 | 4/2010 | Khambete et al. |
| 7,955,064 | B2 | 6/2011 | Heinl |
| 9,724,852 | B1 | 8/2017 | Rees et al. |
| 2004/0195717 | A1 | 10/2004 | Kataoka et al. |
| 2005/0104197 | A1 | 5/2005 | Houle et al. |
| 2005/0140059 | A1 | 6/2005 | Ernst et al. |
| 2005/0266203 | A1 | 12/2005 | La Forest et al. |
| 2006/0182935 | A1 | 8/2006 | Tompson et al. |
| 2006/0208378 | A1 | 9/2006 | Khambete et al. |
| 2006/0208379 | A1 | 9/2006 | Khambete et al. |
| 2007/0007695 | A1 | 1/2007 | Forster |
| 2007/0043128 | A1 * | 2/2007 | Jenkines ............... D06N 7/0078 |
| | | | 521/40.5 |
| 2007/0173551 | A1 * | 7/2007 | Mancosh ............... C08J 11/04 |
| | | | 524/500 |
| 2008/0121461 | A1 * | 5/2008 | Gross ............... D06M 11/82 |
| | | | 442/334 |
| 2008/0220200 | A1 * | 9/2008 | Juriga ............... D06N 7/0065 |
| | | | 428/95 |
| 2009/0004453 | A1 | 1/2009 | Murai et al. |
| 2011/0300334 | A1 | 12/2011 | Ueno et al. |
| 2013/0207292 | A1 | 8/2013 | Spengler |
| 2013/0344281 | A1 | 12/2013 | Wright et al. |
| 2014/0205700 | A1 | 7/2014 | Peroz |
| 2016/0222561 | A1 * | 8/2016 | Coates ............... B32B 5/18 |
| 2017/0305038 | A1 | 10/2017 | Paspek et al. |
| 2017/0361785 | A1 | 12/2017 | Guigner et al. |
| 2019/0351644 | A1 | 11/2019 | Delmas |

FOREIGN PATENT DOCUMENTS

| | | |
|---|---|---|
| EP | 0 606 184 A1 | 1/1994 |
| EP | 2 032 752 B1 | 10/2011 |
| KR | 20170039404 A * | 4/2017 ............. B32B 27/12 |
| WO | 2012156234 A1 | 11/2012 |
| WO | 2019162849 A1 | 8/2019 |

OTHER PUBLICATIONS

International Search Report and Written Opinion of International Application No. PCT/US2021/036913, mail date Nov. 1, 2021, 12 pages.

Non Final Office Action of U.S. Appl. No. 15/726,236, mail date Sep. 14, 2021, 25 pages.

* cited by examiner

FIBER BASED COMPOSITIONS FOR NOISE ABATEMENT AND COMPRESSION RESISTANCE

CROSS REFERENCE TO RELATED APPLICATIONS

This application claims benefit of U.S. provisional application Ser. No. 63/049,427, filed Jul. 8, 2020, the entire disclosure of which is incorporated herein by reference.

FIELD

The present invention is directed at fiber compositions for noise abatement and compression resistance for vehicular applications. More particularly, the fiber compositions are suitable to replace expanded polypropylene foam pads utilized in vehicular carpet applications.

BACKGROUND

It is generally considered desirable to reduce the level of noise within a vehicle passenger compartment. External noises, such as road noise, engine noise, vibrations, etc., as well as noised emanating from within the passenger compartment, may be attenuated through the use of various acoustical materials. Accordingly, sound attenuating materials for vehicles, such as automobiles, are conventionally used in the dashboard, in conjunction with carpeting for floor panels, in the wheel wells, in the trunk compartment, under the hood, and as part of a headliner.

Another consideration with regards specifically to vehicular carpet construction is to ensure that any such construction also provides the requisite resistance to OEM compression testing requirements. That is, in addition to noise abatement considerations, vehicular carpet construction must generally satisfy certain limitations on compression and recovery for various specified loading protocols.

With regards to a given carpet construction, the automotive industry has to date made extensive use of expanded polypropylene (EPP) foam stiffener padding in various carpet lay-ups, which then provides corresponding acoustic and compression performance characteristics. Improving on such acoustic and compression features via the use of alternative materials remains an on-going objective along with potential cost reductions.

SUMMARY

A fiber composition comprising 30% (wt.) to 75% (wt.) binder fiber, 25% (wt.) to 70% (wt.) vehicular carpet waste regrind wherein the fiber composition has a thickness in the range of 3.0 mm to 100.0 mm and a density in the range of 20.0 Kg/m$^3$ to 200.0 Kg/m$^3$. The fiber composition is particularly suitable for replacement of EPP pads utilized in vehicular carpet applications.

A vehicular carpet construction comprising a first non-woven face layer, a second non-woven layer having a higher density than said first non-woven face layer, a film layer, a shoddy fiber layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a shoddy fiber layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a polyurethane foam layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a second non-woven layer having a higher density than said first non-woven face layer, a shoddy fiber layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a second non-woven layer having a higher density than said first non-woven face layer, a mass layer, a shoddy fiber layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a mass layer, a polyurethane foam layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m$^3$ to 200.0 Kg/m$^3$.

A vehicular carpet construction comprising a first non-woven face layer, a second non-woven layer, a film layer, a shoddy fiber layer and a backing layer of a fiber composition comprising vehicular carpet waste regrind and binder fiber, wherein said carpet construction indicates one or more of the following:

(a) a sound transmission loss of 20-68 dB over the frequency range 200-2000 Hz (⅓ octave); or (b) an insertion loss in the range of 5.0 dB at 400 Hz (⅓ octave) to 25.0 dB at 5000 Hz (⅓ octave); or (c) a sound absorption coefficient of greater than 0.7 over the frequency range 400 Hz to 1000 Hz (⅓ octave).

DETAILED DESCRIPTION OF PREFERRED EMBODIMENTS

The present disclosure is directed at fiber compositions for noise abatement and compression resistance for vehicular applications. The fiber composition comprises binder fiber and vehicular carpet waste regrind. The level of binder fiber is preferably 30% (wt.) to 75% (wt.) and the level of vehicular carpet waste regrind is at a level of 25% (wt.) to 70% (wt.).

Binder fiber is reference to fiber that has a relatively lower melting point than the nylon or polyamide fiber, polyester fiber or polypropylene fiber present within the vehicular carpet waste regrind, and when heated, serves to bind the vehicular carpet waste regrind that is present. Binder fiber may preferably comprise a polyethylene terephthalate (PET) bicomponent fiber, comprised of two polymers with different chemical and physical properties (e.g. melting points). Accordingly, one may preferably utilize a binder fiber that comprises a sheath-core construction where the sheath is a relative low melting point polyester, made from a copolymer of PET and the core is PET based. The relatively low melting point polyester may preferably have a melting point in the range of 100° C. to 200° C. More preferably, the relatively low melting point polyester has a melting point of 150° C. to 200° C., or in the range of 175° C. to 185° C. It should therefore be understood that in the broad context of the present invention, the binder fiber is not limited to bicomponent fibers, and may include any fiber that provides a melting point in the range of 100° C. to 200° C. The binder fibers also preferably have a denier (D) value of 2-6 and a length in the range of 20.0 mm to 80.0 mm, more preferably 40.0 mm to 60.0 mm.

The vehicular carpet waste regrind herein comprises as the primary fiber component one or more of a nylon (polyamide) a polyester or polypropylene fiber that may include a polymeric type coating resin, such as a polymeric latex coating. Such coating is preferably sourced from a polyolefin (e.g. polyethylene or polypropylene). The vehicle carpet waste regrind herein itself preferably contains some amount of polymer that has a melting point in the range of 80° C. to 180° C., or even more preferably, in the range of 100° C. to 120° C. The preferred level of such polymer with the aforementioned melting behavior is in the range of 5% (wt.) to 40% (wt.), more preferably 10% (wt.) to 30% (wt.). The vehicular carpet waste is then preferably ground or torn to provide the source of vehicular carpet waste regrind material herein. Such vehicular carpet regrind waste can be sourced from vehicle production facilities where it is then conveniently available at relatively lower cost than EPP.

Figure 1A:
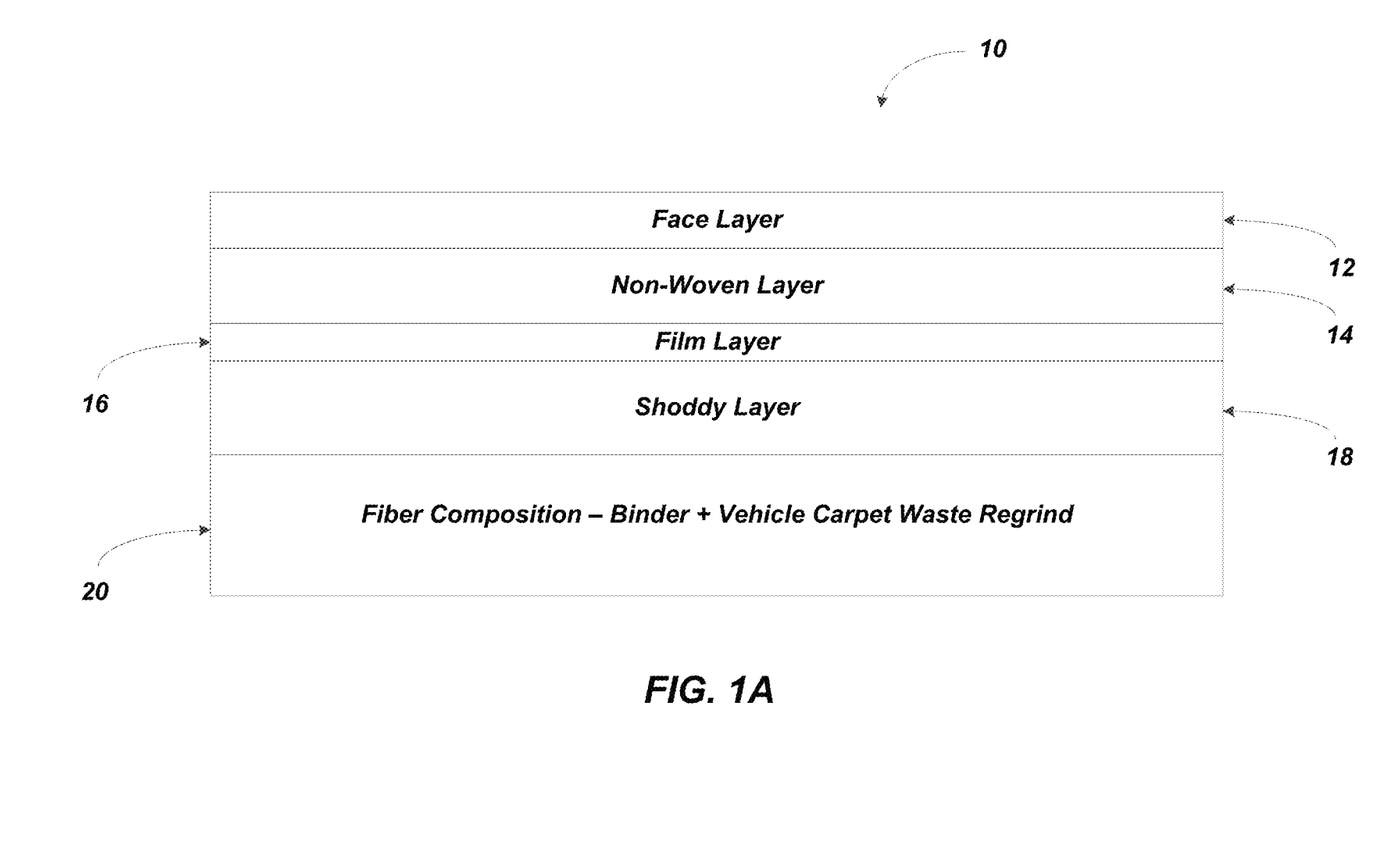
FIG. 1A illustrates the use of the fiber composition herein as a bottom or backing layer in a representative five (5) layer type carpet construction.

The fiber composition (binder and vehicular carpet waste regrind) can be utilized in a representative carpet construction lay up 10 as shown in FIG. 1A. However, it should be understood that in the broad context of the present invention, such fiber composition can now be utilized in any carpet construction lay-up to replace the use of EPP padding material.

The representative carpet construction in FIG. 1A includes a face layer 12 which is preferably a non-woven layer having a thickness in the range of 1.0 mm to 3.0 mm, sourced from PET. Such non-woven may preferably have a basis weight in the range of 300 g/m$^2$ to 1200 g/m$^2$. This is followed by a non-woven layer 14 that is also preferably sourced from PET, at a thickness of 3.0 mm to 5.0 mm at a basis weight of greater than 450 g/m$^2$ to 1200 g/m$^2$. Preferably the non-woven layer 14 has a higher relative density than the non-woven face layer 12. A polymeric film layer 16 is present preferably at a thickness of 0.01 mm to 0.25 mm, where such film is preferably selected from a polyolefin polymer, such as polyethylene or polypropylene. A shoddy fiber insulator layer is then present at 18 where reference to shoddy is generally understood as recycled textile fibers. The shoddy insulator layer preferably has a thickness of 3.0 mm to 50.0 mm at a basis weight of 500 g/m$^2$ to 2000 g/m$^2$.

The fiber composition at 20 herein preferably serves as the bottom or backing layer of a given carpet lay-up. Such fiber composition is preferably utilized to now replace the use of EPP padding as such bottom or backing layer of a given vehicular carpet construction. The fiber composition at 20 is preferably present at a layer thickness of 3.0 mm to 100.0 mm and at a density in the range of 20.0 Kg/m$^3$ to 200.0 Kg/m$^3$. Other preferred thickness values include 10.0 mm to 100.0 mm, or 10.0 mm to 50.0 mm, or 25.0 mm to 50.0 mm. Other preferred densities for the fiber composition 20 include 50.0 to 150.0 Kg/m$^3$ or 100 Kg/m$^3$ to 150.0 Kg/m$^3$. As can therefore be seen, such vehicular carpet construction illustrated in FIG. 1A can avoid the use of expanded polypropylene padding.

Figure 1B:
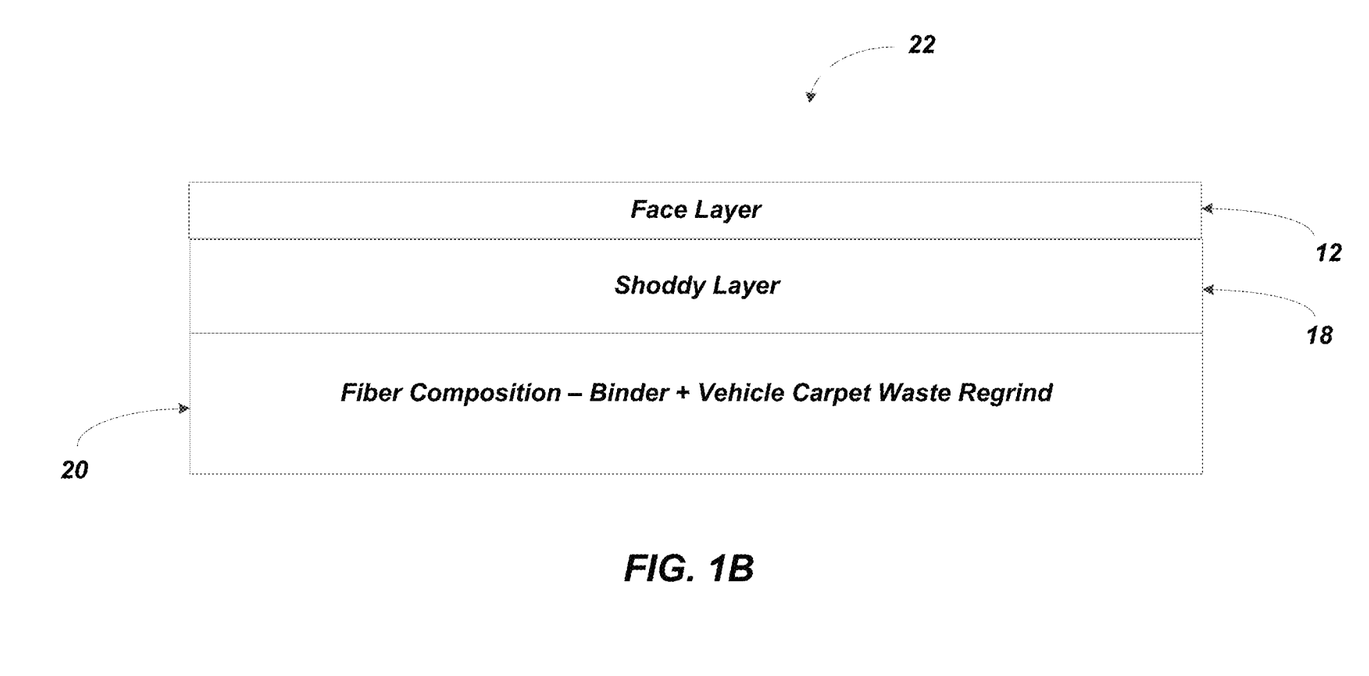
FIG. 1B illustrates the use of the fiber composition herein as a bottom or backing layer in a representative three (3) layer type construction.

As alluded to above, the fiber composition 20 herein may be used as a backing layer in other representative carpet lay-ups that similarly can avoid the need to utilize expanded polypropylene. FIG. 1B show representative carpet construction 22 that again includes a face layer 12, shoddy layer 18 and the fiber composition 20 as the backing layer. The face layer 12 is once again preferably a non-woven layer having a thickness in the range of 1.0 mm to 3.0 mm, sourced from PET. Such non-woven may preferably have a basis weight in the range of 300 g/m$^2$ to 450 g/m$^2$. The shoddy layer 18 is once again recycled textile fiber that preferably has a thickness of 3.0 mm to 50.0 mm at a basis weight of 500 g/m$^2$ to 2000 g/m$^2$.

Figure 1C:
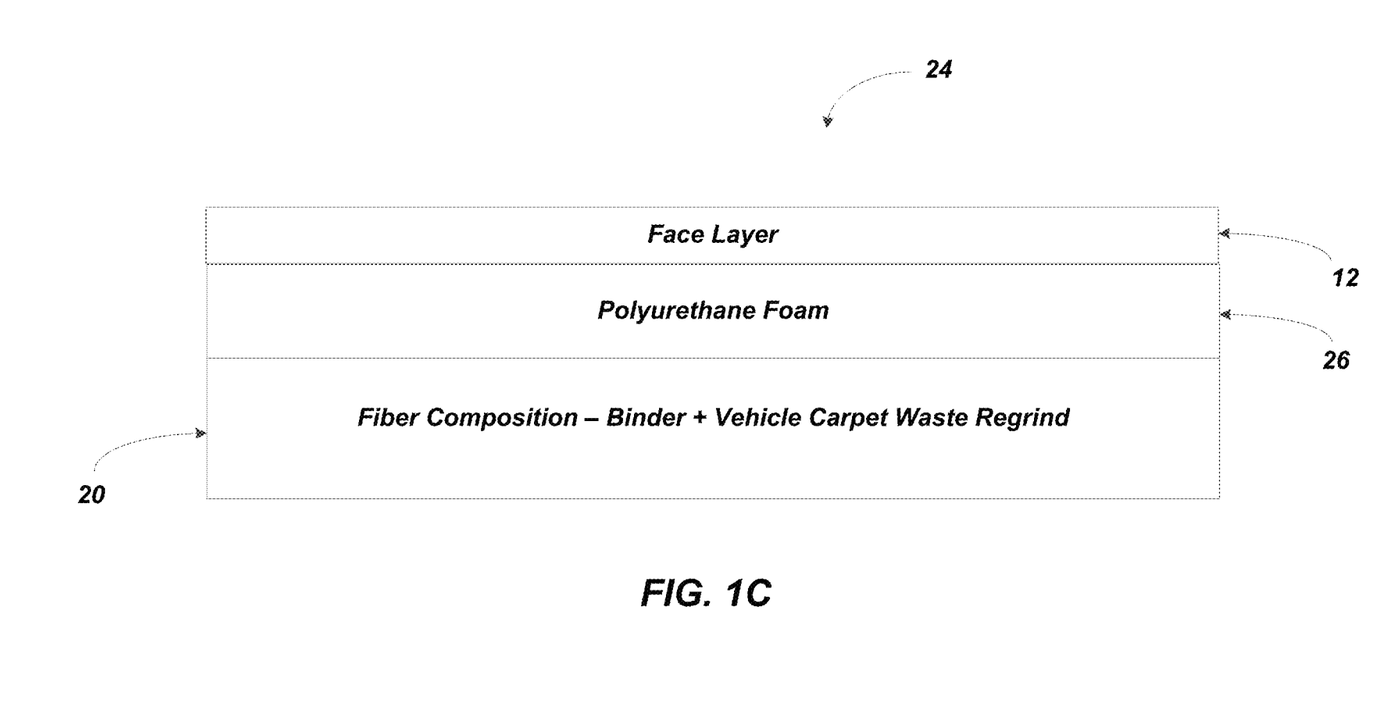
FIG. 1C illustrates the use of the fiber composition herein as a bottom or backing layer in another representative three (3) layer type construction.

FIG. 1C shows representative carpet construction 24. Once again, the face layer 12 is present, which is preferably a non-woven layer having a thickness in the range of 1.0 mm to 3.0 mm, sourced from PET, and at a basis weight in the range of 300 g/m$^2$ to 450 g/m$^2$. This is then followed by a polyurethane foam layer 26 having a thickness in the range of 3.0 mm to 50.0 mm and a density in the range of 30 kg/m$^3$ to 100 kg/m$^3$. The fiber composition backing layer is again shown at 20. The need to utilize expanded polypropylene is again avoided.

Figure 1D:
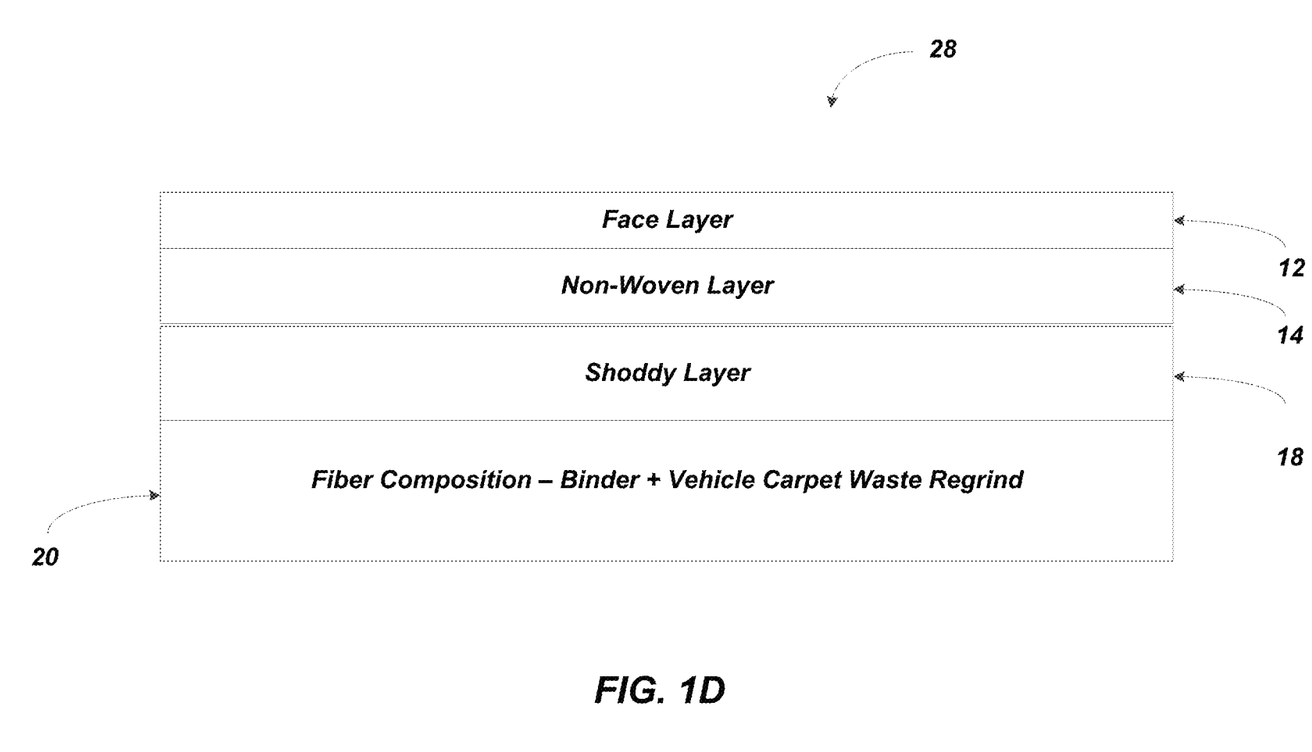
FIG. 1D illustrates the use of the fiber composition herein as a bottom or backing layer in a representative four (4) layer type construction.

FIG. 1D shows representative carpet construction 28. This is similar to representative carpet construction 10 in FIG. 1A but does not contain film layer 16. The fiber composition backing layer is again shown at 20. The need to utilize expanded polypropylene is again avoided.

Figure 1E:
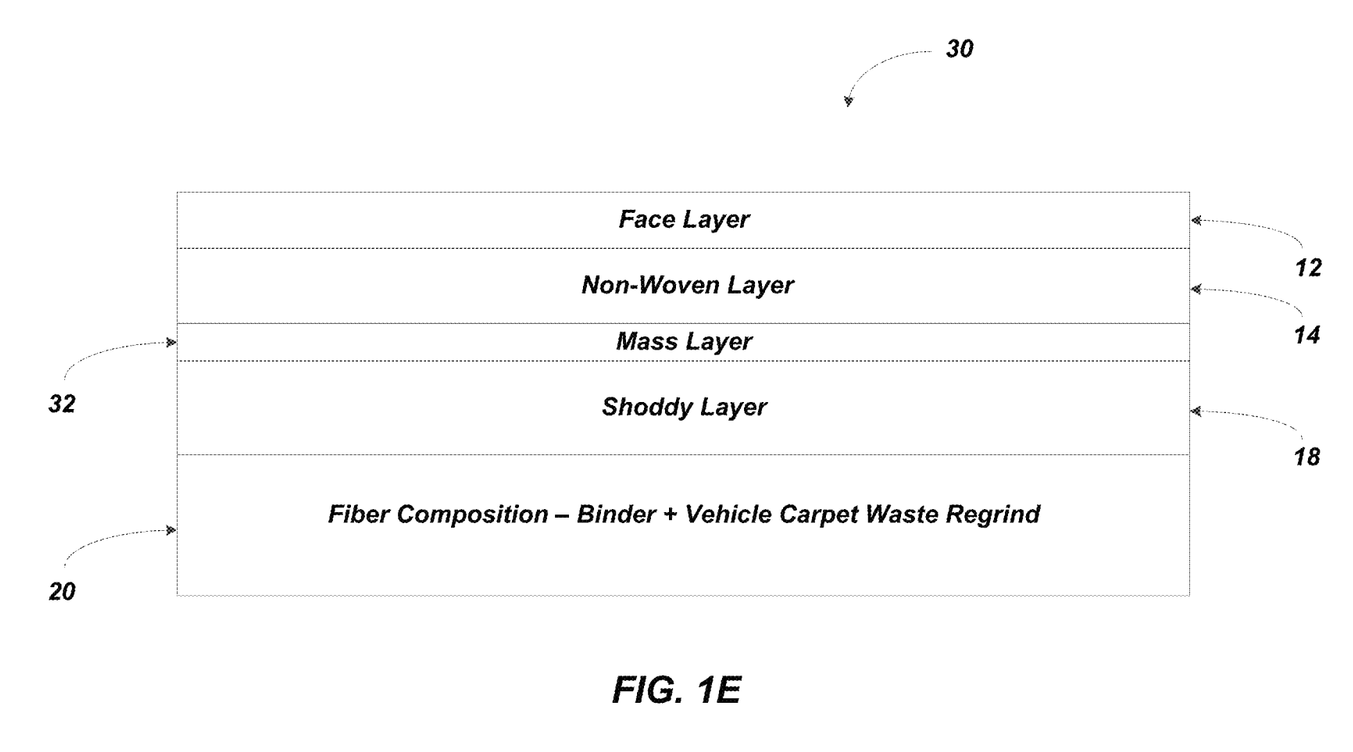
FIG. 1E illustrates the use of the fiber composition herein as a bottom or backing layer in another representative five (5) layer type construction.

FIG. 1E shows representative carpet construction 30. The construction is similar to representative carpet construction 10 in FIG. 1A where film layer 16 is replaced by mass layer 32 which is designed to act as a barrier to sound transmission. Mass layer 32 may preferably comprise a filled (i.e. calcium carbonate) polyethylene-co-vinylacetate sheet and preferably has a thickness in the range of 0.5 mm to 3.0 mm and a basis weight in the range of 800 g/m² to 4000 g/m². The need to utilize expanded polypropylene is again avoided.

Figure 1F:
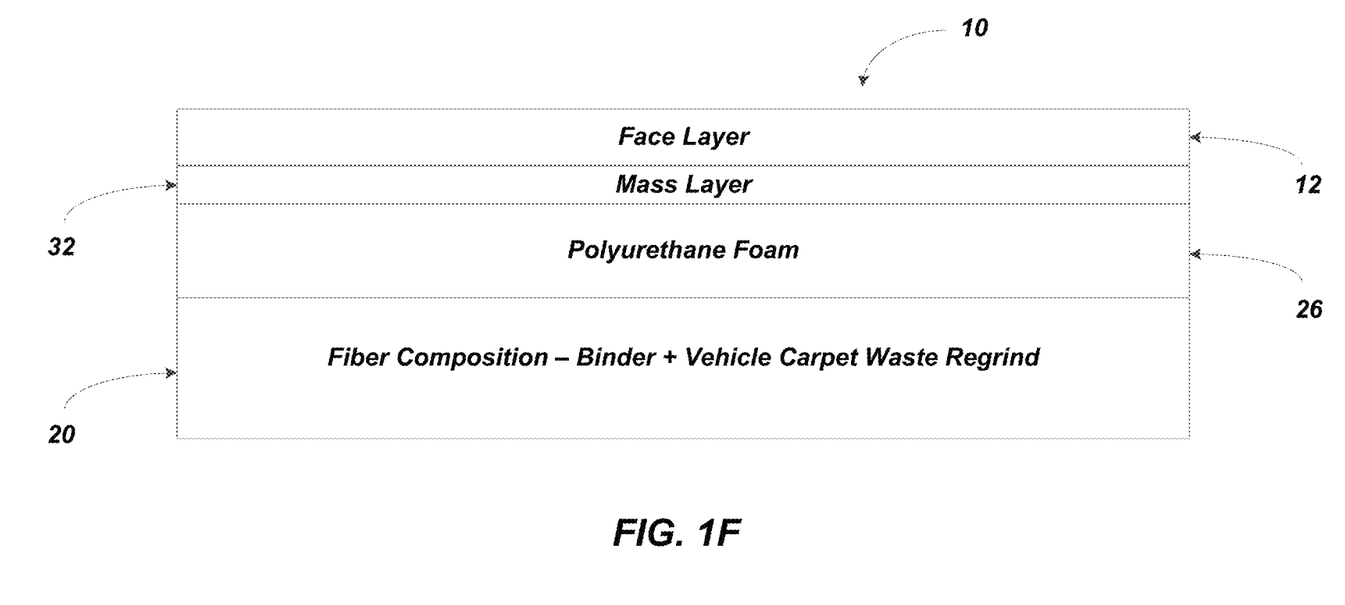
FIG. 1F illustrates the use of the fiber composition herein as a bottom or backing layer in another representative four (4) layer type construction.

FIG. 1F shows representative construction 32. This construction includes face layer 12 as described herein, mass layer 32 as described herein, polyurethane foam layer 26 as described herein and the fiber composition 20 as the backing layer. The need to utilize expanded polypropylene is again avoided.

As noted, the fiber composition 20 herein can fully replace the use of EPP pads in vehicular carpet constructions while providing improved noise abatement and requisite compression performance. Turning first to a consideration of noise abatement, the fiber composition herein demonstrates improved sound transmission loss, insertion loss and absorption coefficient, at key ranges of frequency, as detailed below.

Figure 2:
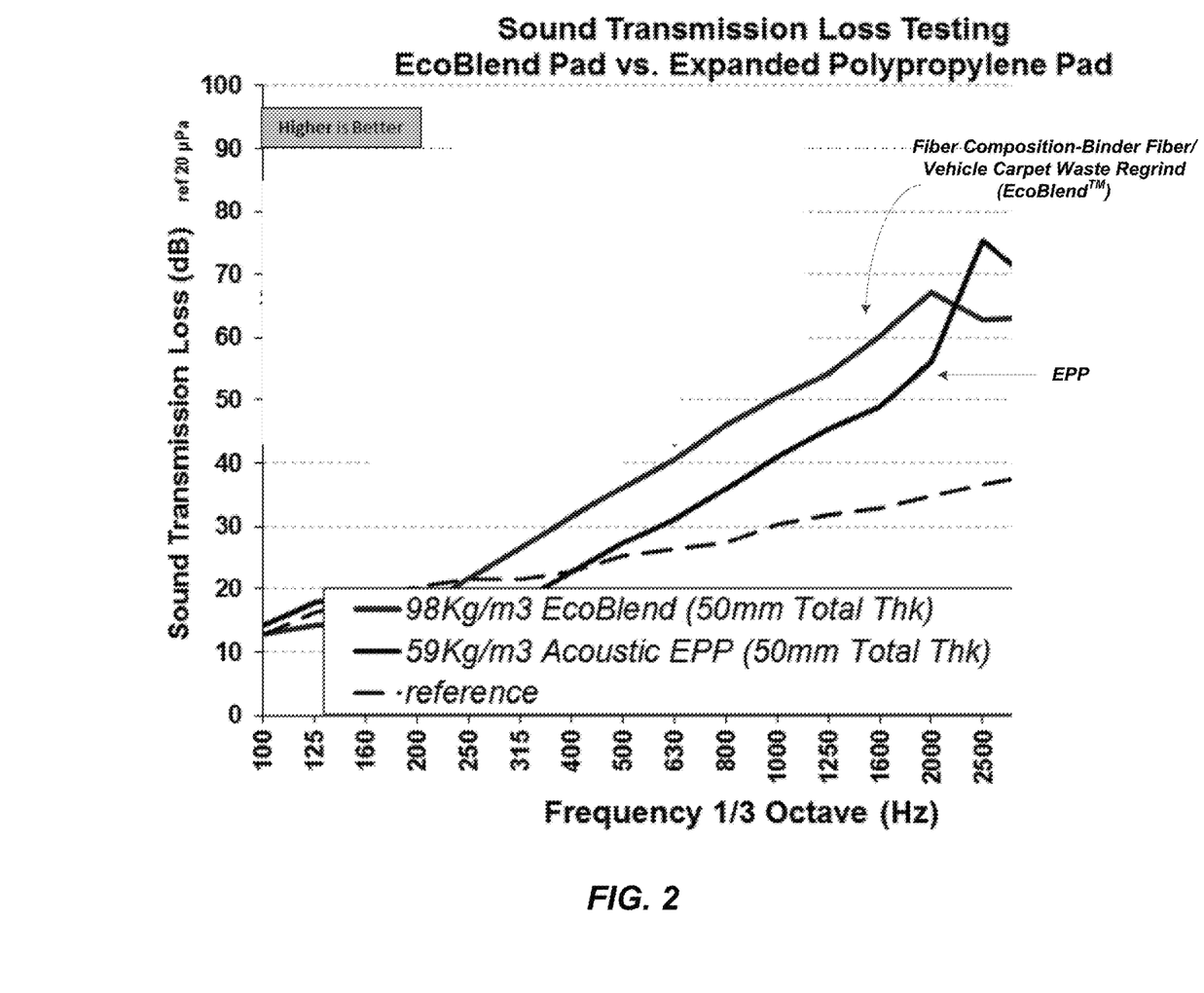
FIG. 2 is a SAE J1400 Test (Jul. 1, 2017) providing a plot of sound transmission loss (dB) versus frequency (Hz) (⅓ octave) for the fiber composition herein employed as the bottom or backing layer in the carpet construction of FIG. 1.

FIG. 2 provides a plot of sound transmission loss (dB) versus frequency (Hz) (⅓ octave), according to the general procedures in SAE J1400 Test (Jul. 1, 2017), for the fiber composition herein as employed as the bottom or backing layer 20 in the carpet construction of FIG. 1A, where the face layer, non-woven layer, film layer, and insulator layer had a thickness of 10.0 mm. The fiber composition herein (binder fiber and vehicular carpet waste regrind), identified in FIG. 2 by the trademark ECOBLEND™, was present at a thickness of about 40.0 mm at a density of 98 Kg/m³, thereby providing a total carpet thickness of about 50.0 mm. This was compared with the use of expanded polypropylene padding having a thickness of 40.0 mm at a density of about 59 Kg/m³ on the backside of the same 10.0 mm carpet construction (face layer, hard layer, thin film and insulator layer). As can be seen, the fiber composition based carpet construction, over the frequency 200-2000 (Hz) (⅓ octave), provided a sound transmission loss (dB) in the range of 20-68 that was consistently better than the carpet construction utilizing EPP. On average, the sound transmission loss improvement of the carpet construction utilizing the fiber composition herein was about 10 dB better over the frequency 200-2000 (Hz) ⅓ octave.

Figure 3:
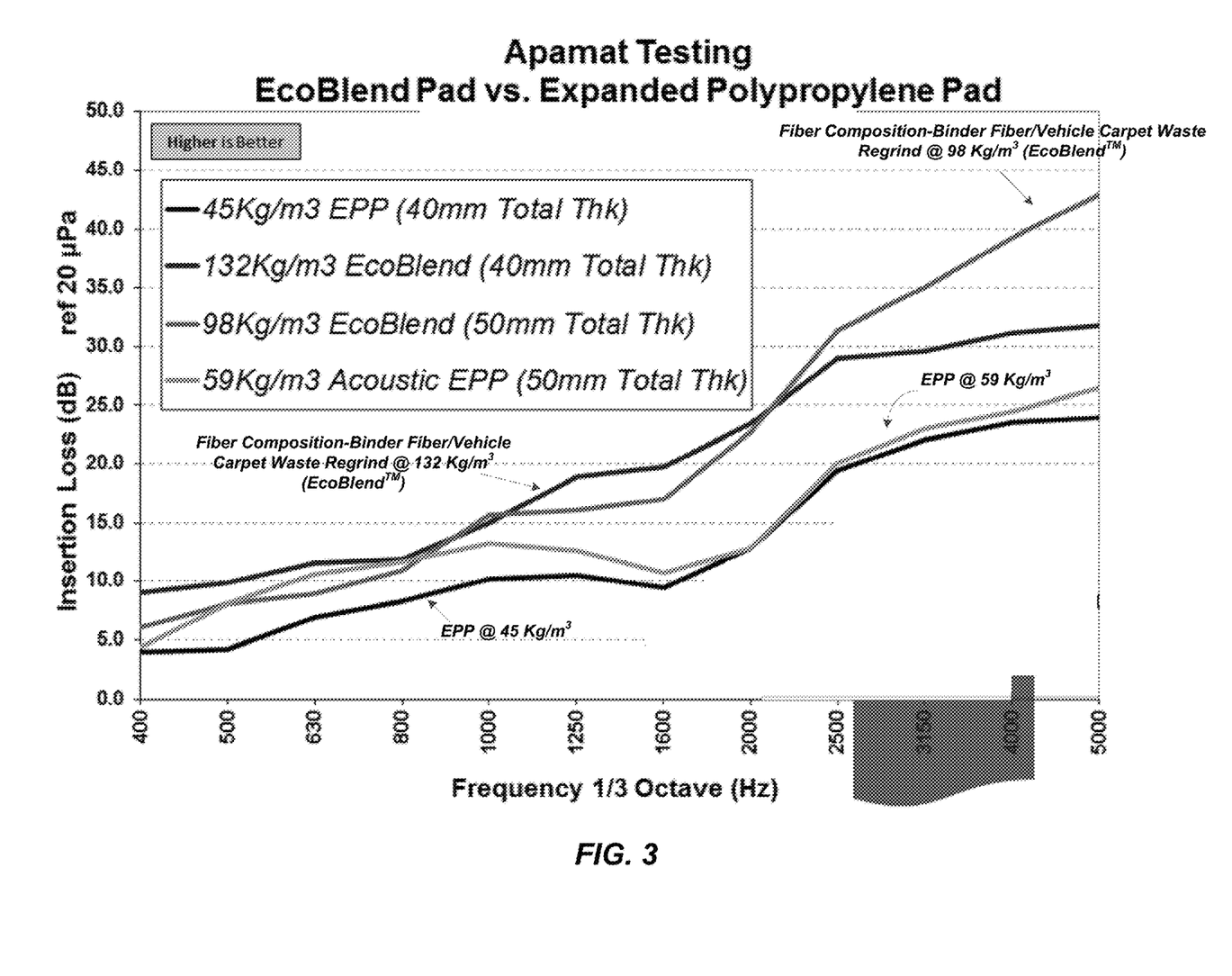
FIG. 3 provides the result of an APAMAT insertion loss test, namely a plot of insertion loss (dB) versus frequency (Hz) (⅓ octave) for the identified samples.

FIG. 3 provides the results of an APAMAT-II (Autoneum) insertion loss test, namely a plot of insertion loss (dB) versus frequency (Hz) (⅓ octave) for the identified samples of either the fiber composition herein or EPP as the bottom layer 20, as applied to a 10.0 mm thick layup of carpet construction (see FIG. 1A). Accordingly, the following was applied as the bottom layer of such carpet construction: (1) EPP at a thickness of about 30.0 mm at a density of 45 Kg/m³ to thereby provide a total thickness of about 40.0 mm; (2) the fiber composition herein at a density of 132 Kg/m³ at a thickness of about 30.0 mm to thereby provide a total thickness of about 40.0 mm; (3) the fiber composition herein at a density of 98 Kg/m³ at a thickness of about 40.0 mm to thereby provide a total thickness of about 50.0 mm; (4) EPP at a thickness of about 40.0 mm at a density of about 59 Kg/m³ to thereby provide a total thickness of about 50.0 mm. As can be observed, the fiber composition herein when applied to the backside of the carpet construction provides insertion losses in the range of about 5.0 dB at 400 Hz (⅓ octave) to 25.0 dB at 5000 Hz (⅓ octave). In addition, it can once again be observed that the fiber composition herein, when applied to the backside of a given carpet construction, outperforms the use of EPP.

Figure 4:
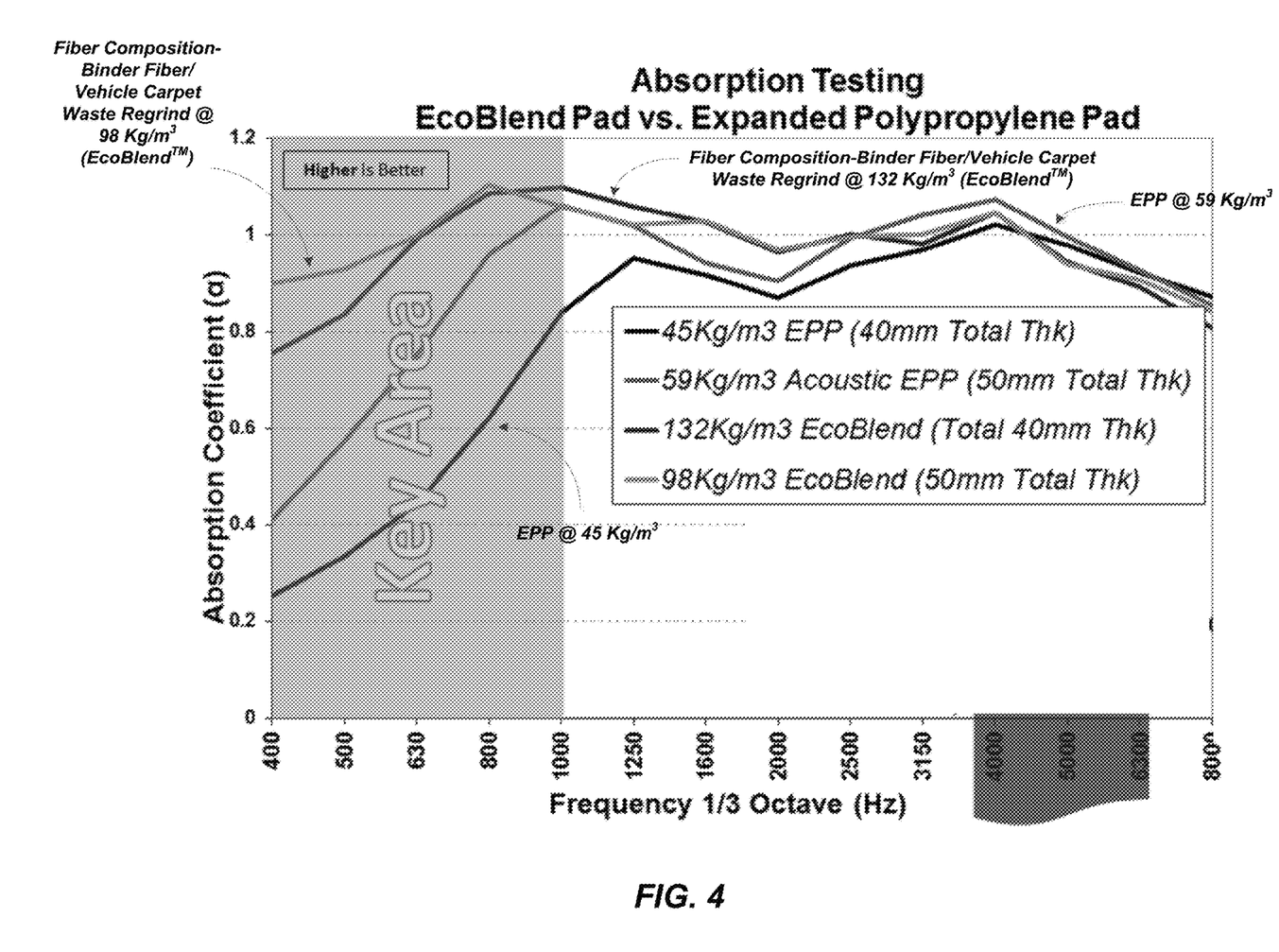
FIG. 4 provides a plot of the sound absorption coefficient (a) versus frequency (Hz) (⅓ octave) for the identified samples.

Attention is next directed to FIG. 4 which provides a plot of the sound absorption coefficient (α) versus frequency (Hz) (⅓ octave) for the identified samples of either the fiber composition herein or EPP, as applied as the bottom layer 20 to a 10.0 mm thick layup of carpet construction (see FIG. 1A). The sound absorption coefficient is determined according to the general procedures of ASTM C423-17 "Standard Test Method For Sound Absorption Coefficients by the Reverberation Room Method." Accordingly, once again, the following was applied as the bottom layer 20 of such carpet construction: (1) EPP at a thickness of about 30.0 mm at a density of 45 Kg/m³ to thereby provide a total thickness of about 40.0 mm; (2) the fiber composition herein at a density of 132 Kg/m³ at a thickness of about 30.0 mm to thereby provide a total thickness of about 40.0 mm; (3) the fiber composition herein at a density of 98 Kg/m³ at a thickness of about 40.0 mm to thereby provide a total thickness of about 50.0 mm; (4) EPP at a thickness of about 40.0 mm at a density of about 59 Kg/m³ to thereby provide a total thickness of about 50.0 mm. As can therefore be observed in FIG. 4, over the frequency range of 400 Hz to 1000 Hz (⅓ octave), the fiber composition herein, as applied as the bottom layer of the carpet construction as shown in FIG. 1, indicates a sound absorption coefficient (a) having a value of greater than 0.70, or more preferably, in the range of greater than 0.70 to 1.2, and which significantly outperforms EPP in what may be considered a key area of frequency ranges at or below 1000 Hz.

It should be noted that while the above sound testing utilized the carpet construction in FIG. 1A, it is contemplated that similar results would apply for the carpet constructions of FIGS. 1B-1F. In addition, as can now be appreciated, such carpet constructions avoid the use of expanded polypropylene foam pads. Accordingly, the present invention provides a carpet construction that indicates one or more of the following: (a) sound transmission loss of 20-68 dB over the frequency range 200-2000 Hz (⅓ octave); or (b) an insertion loss in the range of 5.0 dB at 400 Hz (⅓ octave) to 25.0 dB at 5000 Hz (⅓ octave); or (c) a sound absorption coefficient of greater than 0.70 over the frequency range 400 Hz to 1000 Hz (⅓ octave).

The fiber compositions herein are also such that they compare or exceed the compression performance exhibited by EPP, when utilized in a given carpet construction. For comparison evaluation, the fiber compositions herein were evaluated according to an OEM compression testing protocol (Honda Floor Carpet Specification, PC Spec 6-20, pp. 18-20) where as shown in Table 1 below, various compression forces in Newtons (N) are applied to the samples undergoing evaluation, along with the identification of the weight that is utilized on the sample to achieve the identified force:

TABLE 1

| Displacement Designations For Identified Compression Force | | |
|---|---|---|
| Displacement Designation | Force (Newtons) | Weight (Kg) |
| $D_o$ | — | 0.425 |
| $D_1$ | 30 | 3.06 |
| $D_2$ | 100 | 10.2 |
| $D_3$ | 200 | 20.4 |
| $D_4$ | 300 | 30.6 |

Table 2 below next provides the performance requirements of the samples tested as to whether or not they receive a Class A or Class B designation. As can be seen, the Class B designation identifies relatively lower deflection requirements for the identified loading increments, which thereby identifies a relatively stiffer sample, as compared to the Class A designation.

TABLE 2

Compression Performance Requirements/Designations

| Load Section Designation | Class A | Class B |
|---|---|---|
| 0-30N (D5) | 10 mm or less | 4 mm or more 7 mm or less |
| 30-100N (D6) | 6 mm or less | 4 mm or less |
| 100-200N (D7) | 6 mm or less | 4 mm or less |
| 200-300N (D8) | 7 mm or less | 7 mm or less |

Table 3 below provides the results of comparative testing of the fiber compositions herein versus EPP pads either on their own and in the representative carpet lay-up construction illustrated in FIG. 1. It is noted that in Table 3, due to the frame of reference for the measurements recorded, any identified increase in values for $D_1$, $D_2$, $D_3$ and $D_4$, as compared to the initial height $D_0$, actually represents the amount of compression in mm that the sample realized from the indicated applied force (or weight applied on the sample) after 1.0 minute. For example, for the initial EPP Pad entry, at 200N of force, the EPP Pad underwent a compression of 98.5−98=0.5 mm.

TABLE 3

Comparative Compression Testing

| Material | Density ($Kg/m^3$) | Thickness (mm) | Initial Height (mm) ($D_0$) | 30N $D_1$ | 100N ($D_2$) | 200N ($D_3$) | 300N ($D_4$) |
|---|---|---|---|---|---|---|---|
| EPP Pad | 45 | 30 | 98 | 98 | 98 | 98.5 | 98.75 |
| EPP Pad | 59 | 40 | 88.5 | 89 | 89 | 89.5 | 89.75 |
| Fiber Composition Herein | 132 | 30 | 96.5 | 98 | 99 | 100 | 100.5 |
| Fiber Composition Herein | 98 | 40 | 85.5 | 86.75 | 89 | 92 | 95 |
| EPP Pad @45 $Kg/m^3$ With Carpet | | 40 | 89 | 90 | 91 | 91.5 | 92 |
| EPP Pad @ 59 $Kg/m^3$ With Carpet | | 50 | 79.5 | 81 | 81.5 | 82 | 82.75 |
| Fiber Composition Herein @ 132 $Kg/m^3$ | | 40 | 88.5 | 89.5 | 91.25 | 92.5 | 93.5 |
| Fiber Composition Herein @ 98 $Kg/m^3$ | | 50 | 76 | 78.5 | 81.5 | 84.5 | 86 |

Table 4 provides the analysis of the data in Table 3, identifying the compression performance and determination of either Class A or Class B designations shown in Table 2:

TABLE 4

Compression Performance

| Material | 0-30N $D_5$ [$D_1$-$D_0$] | 30-100N $D_6$ [$D_2$-$D_1$] | 100-200N $D_7$ [$D_3$-$D_2$] | 200-300N $D_8$ [$D_4$-$D_3$] | Total Recovery (mm) |
|---|---|---|---|---|---|
| EPP Pad | 0 | 0 | 0.5 | 0.25 | 0 |
| EPP Pad | 0.5 | 0 | 0.5 | 0.25 | 0.5 |
| Fiber Composition Herein | 1.5 | 1 | 1 | 0.5 | 1.0 |
| Fiber Composition Herein | 1.25 | 2.25 | 3 | 3 | 0.5 |
| EPP Pad @45 $Kg/m^3$ With Carpet | 1 | 1 | 0.5 | 0.5 | 0.5 |
| EPP Pad @ 59 $Kg/m^3$ With Carpet | 1.5 | 0.5 | 0.5 | 0.75 | 0.5 |
| Fiber Composition Herein @ 132 $Kg/m^3$ | 1 | 1.75 | 1.25 | 1 | 0.5 |
| Fiber Composition Herein @ 98 $Kg/m^3$ | 2.5 | 3 | 3 | 1.5 | 1.5 |

As can be seen from Table 4, the fiber compositions here, on their own, or as applied to a representative carpet lay-up, provide comparative compression performance and recovery relative to EPP padding, and Class B designation (see Table 2). In addition, reference to "Total Recovery" in Table 4 is reference to how much in mm the sample tested did not bounce back to its original dimensions.

It may therefore now be appreciated that the present invention provides a fiber composition for noise abatement and compression resistance for vehicle application. The fiber compositions are suitable to replace and avoid the use of expanded polypropylene foam pads that are currently utilized in vehicular carpet applications.

What is claimed is:

1. A fiber composition comprising:
   30% (wt.) to 75% (wt.) binder fiber, the binder fiber having a melting point in the range of 100° C. to 200° C., a denier value of 2-6 and a length in the range of 20.0 mm to 80.0 mm;
   25% (wt.) to 70% (wt.) vehicular carpet waste regrind, the vehicular carpet waste regrind comprising one or more of a polyamide, a polyester, or polypropylene;
   wherein said fiber composition has a thickness in the range of 3.0 mm to 100.0 mm and a density in the range of 20.0 Kg/m3 to 200.0 Kg/m3.

2. The fiber composition of claim 1 wherein said vehicular carpet waste regrind contains 5% (wt.) to 40% (wt.) of polymer having a melting point in the range of 80° C. to 180° C.

3. The fiber composition of claim 1 combined with a vehicular carpet, wherein said fiber composition forms a backing layer of said vehicular carpet.

4. A vehicular carpet construction comprising
   a first non-woven face layer, a second non-woven layer having a higher density than said first non-woven face layer, a film layer, a shoddy fiber layer and a backing layer of a fiber composition comprising 25% (wt.) to 70% (wt.) vehicular carpet waste regrind and 30% (wt.) to 75% (wt.) binder fiber wherein said fiber composition has a thickness in the range of 3.0 mm to 100.0 mm and has a density in the range of 20.0 Kg/m3 to 200.0 Kg/m3, wherein said binder fiber has a melting point in the range of 100° C. to 200° C., a denier value of 2-6, and a length in the range of 20.0 mm to 80.0 mm, and the vehicular carpet waste regrind comprises one or more of a polyamide, a polyester, or polypropylene.

* * * * *